US009672364B2

(12) United States Patent
Zhang et al.

(10) Patent No.: US 9,672,364 B2
(45) Date of Patent: Jun. 6, 2017

(54) DIFFERENTIALLY PRIVATE LINEAR QUERIES ON HISTOGRAMS

(71) Applicant: Microsoft Corporation, Redmond, WA (US)

(72) Inventors: Li Zhang, Sunnyvale, CA (US); Kunal Talwar, San Francisco, CA (US); Aleksandar Nikolov, New York, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 190 days.

(21) Appl. No.: 13/831,948

(22) Filed: Mar. 15, 2013

(65) Prior Publication Data

US 2014/0283091 A1  Sep. 18, 2014

(51) Int. Cl.
| H04L 9/00 | (2006.01) |
| G06F 21/60 | (2013.01) |
| G06F 21/62 | (2013.01) |
| G06F 17/18 | (2006.01) |

(52) U.S. Cl.
CPC .............. G06F 21/60 (2013.01); G06F 17/18 (2013.01); G06F 21/6245 (2013.01)

(58) Field of Classification Search
CPC .................................................... G06F 19/322
USPC ...................................................... 726/4–11
See application file for complete search history.

(56) References Cited

U.S. PATENT DOCUMENTS

| 7,069,560 | B1 * | 6/2006 | Cheyer ................... G06F 9/465 709/202 |
| 7,363,192 | B2 | 4/2008 | Dwork et al. |
| 7,562,071 | B2 | 7/2009 | Dwork et al. |
| 7,698,250 | B2 | 4/2010 | Dwork et al. |
| 7,769,707 | B2 | 8/2010 | Dwork et al. |
| 7,818,335 | B2 | 10/2010 | Dwork et al. |
| 8,005,821 | B2 | 8/2011 | Dwork et al. |

(Continued)

OTHER PUBLICATIONS

Pathak, et al., "Large Margin Gaussian Mixture Models with Differential Privacy", Retrieved at <<http://www.cs.cmu.edu/~manasp/docs/dp-lmgmm-tdsc.pdf>>, IEEE Transactions on Dependable and Secure Computing, Jul. 2012, pp. 7.

(Continued)

*Primary Examiner* — Josnel Jeudy
(74) *Attorney, Agent, or Firm* — Jonathan M. Waldman

(57) ABSTRACT

The privacy of linear queries on histograms is protected. A database containing private data is queried. Base decomposition is performed to recursively compute an orthonormal basis for the database space. Using correlated (or Gaussian) noise and/or least squares estimation, an answer having differential privacy is generated and provided in response to the query. In some implementations, the differential privacy is $\epsilon$-differential privacy (pure differential privacy) or is $(\epsilon, \delta)$-differential privacy (i.e., approximate differential privacy). In some implementations, the data in the database may be dense. Such implementations may use correlated noise without using least squares estimation. In other implementations, the data in the database may be sparse. Such implementations may use least squares estimation with or without using correlated noise.

29 Claims, 6 Drawing Sheets

(56) References Cited

U.S. PATENT DOCUMENTS

| | | |
|---|---|---|
| 8,281,121 B2 | 10/2012 | Nath et al. |
| 2006/0200431 A1* | 9/2006 | Dwork et al. .................. 706/12 |
| 2010/0266078 A1* | 10/2010 | Nakayama et al. .......... 375/346 |
| 2011/0238611 A1* | 9/2011 | McSherry et al. ............. 706/52 |
| 2012/0143922 A1 | 6/2012 | Rane et al. |
| 2013/0145473 A1* | 6/2013 | Cormode et al. .............. 726/26 |
| 2014/0005975 A1* | 1/2014 | Ruizenaar .................... 702/150 |
| 2014/0283091 A1* | 9/2014 | Zhang .................... G06F 21/60 726/26 |

OTHER PUBLICATIONS

Bansal, Nikhl., "Constructive Algorithms for Discrepancy Minimization", Retrieved at <<http://ieeexplore.ieee.org/stamp/stamp.jsp?tp=&arnumber=5670954>>, In Proceedings of the IEEE 51st Annual Symposium on Foundations of Computer Science, Oct. 26, 2010, pp. 8.

Barak, et al., "Privacy, Accuracy, and Consistency Too: A Holistic Solution to Contingency Table Release", Retrieved at <<http://citeseerx.ist.psu.edu/viewdoc/download;jsessionid=63DD308B512D90E042E2OECD175B477F?doi=10.1.1.163.5503&rep=rep1&type=pdf>>, In Proceedings of the 26th Symposium on Principles of Database Systems, Jun. 11, 2007, pp. 9.

Barany, et al., "Approximation of the Sphere by Polytopes Having Few Vertices", Retrieved at <<http://www.ams.org/journals/proc/1988-102-03/S0002-9939-1988-0928998-8/S0002-9939-1988-0928998-8.pdf>>, In Proceedings of the American Mathematical Society, vol. 102, Issue 3, Mar. 1988, pp. 9.

Bhaskara, et al., "Unconditional Differentially Private Mechanisms for Linear Queries", Retrieved at <<http://www.cs.cmu.edu/~ravishan/privacy.pdf>>, In Proceedings of the 44th Symposium on Theory of Computing, May 19, 2012, pp. 25.

Blum, et al., "Practical Privacy: The SuLQ Framework", Retrieved at <<http://people.csail.mit.edu/costan/readings/misc_papers/SuLQ.pdf>>, In Proceedings of the Twenty-Fourth ACM SIGMOD-SIGACT-SIGART Symposium on Principles of Database Systems, Jun. 13, 2005, pp. 11.

Blum, et al., "A Learning Theory Approach to Non-Interactive Database Privacy", Retrieved at <<http://www.cs.cmu.edu/~avrim/Papers/privacy.pdf>>, In Proceedings of the 40th Annual ACM Symposium on Theory of Computing, May 17, 2008, pp. 9.

Bourgain, et al., "Invertibility of "Large" Submatrices with Applications to the Geometry of Banach Spaces and Harmonic Analysis", Retrieved at <<http://link.springer.com/content/pdf/10.1007%2FBF02772174>>, In Israel Journal of Mathematics, vol. 57, Issue 2, Jun. 1987, pp. 88.

Brenner, et al., "Impossibility of Differentially Private Universally Optimal Mechanisms", Retrieved at <<http://ieeexplore.ieee.org/xpls/abs_all.jsp?arnumber=5670945>>, In 51th Annual IEEE Symposium on Foundations of Computer Science, Oct. 23, 2010, pp. 10.

Chan, et al., "Private and Continual Release of Statistics", Retrieved at <<http://www.cs.berkeley.edu/~dawnsong/papers/2010%20private%20continual.pdf>>, In Proceedings of the 37th International Colloquium Conference on Automata, Languages and Programming, Jul. 6, 2010, pp. 13.

Chandrasekaran, et al., "A Discrepancy Based Approach to Integer Programming", Retrieved at <<http://arxiv.org/pdf/1111.4649.pdf>>, In Proceedings of the Computing Research Repository, Nov. 2011, pp. 28.

Chazelle, Bernard., "The Discrepancy Method: Randomness and Complexity", Retrieved at <<http://www.cs.princeton.edu/~chazelle/pubs/book.pdf>>, In the Book of Discrepancy Method, Jul. 24, 2000, pp. 491.

De, Anindya., "Lower Bounds in Differential Privacy", Retrieved at <<http://arxiv.org/pdf/1107.2183.pdf>>, In Proceedings of the 9th International Conference on Theory of Cryptography, Mar. 19, 2012, pp. 27.

Ding, et al., "Differentially Private Data Cubes: Optimizing Noise Sources and Consistency", In Proceedings of the ACM SIGMOD International Conference on Management of Data, Jun. 12, 2011, pp. 12.

Dinur, et al., "Revealing Information While Preserving Privacy", Retrieved at <<http://www.cse.psu.edu/~asmith/privacy598/papers/dn03.pdf>>, In Proceedings of the Twenty-Second ACM SIGMOD-SIGACT-SIGART Symposium on Principles of Database Systems, Jun. 9, 2003, pp. 9.

Dwork, et al., "Our Data, Ourselves: Privacy via Distributed Noise Generation", Retrieved at <<http://www.wisdom.weizmann.ac.il/~/naor/PAPERS/odo.pdf>>, In Proceedings of the 24th Annual International Conference on the Theory and Applications of Cryptographic Techniques, May 28, 2006, pp. 18.

Dwork, et al., "Calibrating Noise to Sensitivity in Private Data Analysis", Retrieved at <<http://www.cs.bgu.ac.il/~kobbi/papers/sensitivity-tcc-final.pdf>>, In Proceedings of the Third Conference on Theory of Cryptography, Mar. 4, 2006, pp. 20.

Dwork, et al., "The Price of Privacy and the Limits of LP Decoding", Retrieved at <<http://dsp.rice.edu/sites/dsp.rice.edu/files/cs/DworkMcSherryTalwar.pdf>>, In Proceedings of the Thirty-Ninth Annual ACM Symposium on Theory of Computing, Jun. 11, 2007, pp. 10.

Dwork, et al., "On the Complexity of Differentially Private Data Release: Efficient Algorithms and Hardness Results", Retrieved at http://www.wisdom.weizmann.ac.il/~naor/PAPERS/complexity_diff_private_rel.pdf>>, In Proceedings of the 41st Annual ACM Symposium on Theory of Computing, May 31, 2009, pp. 10.

Dwork, et al., "Boosting and Differential Privacy", Retrieved at <<http://research.microsoft.com/pubs/155174/dworkrv10.pdf>>, In Proceedings of the IEEE 51st Annual Symposium on Foundations of Computer Science, Oct. 23, 2010, pp. 10.

Dwork, et al., "New Efficient Attacks on Statistical Disclosure Control Mechanisms", In Proceedings of the 28th Annual Conference on Cryptology, Aug. 17, 2008, pp. 13.

Ghosh, et al., "Universally Utility-Maximizing Privacy Mechanisms", Retrieved at <<http://theory.stanford.edu/~tim/papers/priv.pdf>>, In Proceedings of the 41st Annual ACM Symposium on Theory of Computing, May 31, 2009, pp. 9.

Gupta, et al., "Privately Releasing Conjunctions and the Statistical Query Barrier", Retrieved at <<http://people.seas.harvard.edu/~jullman/LocalConjunctions_STOC.pdf>>, In Proceedings of the 43rd Annual ACM Symposium on Theory of Computing, Jun. 6, 2011, pp. 10.

Gupta, et al., "Iterative Constructions and Private Data Release", Retrieved at <<http://ebooks.narotama.ac.id/files/Theory%20of%20Cryptography;%209th%20Theory%20of%20Cryptography%20Conference,%20TCC%202012/Chapter%2019%20Iterative%20Constructions%20and%20Private%20Data%20Release.pdf>>, In Proceedings of the 9th International Conference on Theory of Cryptography, Mar. 19, 2012, pp. 18.

Gupte, et al., "Universally Optimal Privacy Mechanisms for Minimax Agents", Retrieved at <<http://arxiv.org/pdf/1001.2767v1.pdf>>, In Proceedings of the Twenty-Ninth ACM SIGMOD-SIGACT-SIGART Symposium on Principles of Database Systems, Jun. 2010, pp. 11.

Hardt, et al., "A Simple and Practical Algorithm for Differentially Private Data Release", Retrieved at <<http://books.nips.cc/papers/files/nips25/NIPS2012_1143.pdf>>, In Neural Information Processing Systems Conference, Dec. 2012, pp. 9.

Hardt, et al., "A Multiplicative Weights Mechanism for Privacy-Preserving Data Analysis", Retrieved at <<http://moritzhardt.com/papers/HR10.pdf>>, In Proceedings of the IEEE 51st Annual Symposium on Foundations of Computer Science, Oct. 23, 2010, pp. 10.

Hardt, et al., "On the Geometry of Differential Privacy", Retrieved at <<http://mrtz.org/papers/HT10geometry.pdf>>, In Proceedings of the 42nd ACM Symposium on Theory of Computing, Jun. 2010, pp. 29.

Hay, et al., "Boosting the Accuracy of Differentially Private Histograms through Consistency", Retrieved at <<http://www.vldb.org/pvldb/vldb2010/papers/R91.pdf>>, In Proceedings of the Very Large Database Endowment, vol. 3, Issue 1, Sep. 2010, pp. 12.

(56) References Cited

OTHER PUBLICATIONS

Kasiviswanathan, et al., "The Power of Linear Reconstruction Attacks", Retrieved at <<http://arxiv.org/pdf/1210.2381.pdf>>, In Computing Research Repository, Oct. 2012, pp. 30.

Kasiviswanathan, et al., "The Price of Privately Releasing Contingency Tables and the Spectra of Random Matrices with Correlated Rows", Retrieved at <<http://www.math.missouri.edu/~rudelson/papers/public.pdf>>, In Proceedings of the 42nd ACM Symposium on Theory of Computing, Jun. 5, 2010, pp. 10.

Larsen, Kasper Green., "On Range Searching in the Group Model and Combinatorial Discrepancy", Retrieved at <<http://ieee-focs.org/FOCS-2011-Papers/On%20Range%20Searching%20in%20th%20Group%20Model%20and%20Combinatorial%20Discrepancy.pdf>>, In IEEE 52nd Annual Symposium on Foundations of Computer Science, Oct. 22, 2011, pp. 8.

Li, et al., "Optimizing Linear Counting Queries under Differential Privacy", Retrieved at <<http://www.cs.cornell.edu/~mhay/papers/li2010optimizing.pdf>>, In Proceedings of the Twenty-Ninth ACM SIGMOD-SIGACT-SIGART Symposium on Principles of Database Systems, Jun. 6, 2010, pp. 13.

Li, et al., "An Adaptive Mechanism for Accurate Query Answering Under Differential Privacy", Retrieved at <<http://people.cs.umass.edu/~miklau/pubs/dp/li2012adaptive.pdf>>, In Journal of Proceedings of the Very Large Database Endowment, vol. 5, Issue 6, Feb. 2012, pp. 12.

Li, et al., "Measuring the Achievable Error of Query Sets Under Differential Privacy", Retrieved at <<http://arxiv.org/pdf/1202.3399v1.pdf>>, In Computing Research Repository, Feb. 2012, pp. 27.

Matousek, Jiri., "Geometric Discrepancy (An Illustrated Guide)", Retrieved at <<http://bookshelf.theopensourcelibrary.org/2010_CharlesUniversity_GeometricDiscrepancy.pdf>>, In Illustrated Guide Series, Jun. 1999, pp. 300.

Matousek, Jiri., "The Determinant Bound for Discrepancy is Almost Tight", Retrieved at <<http://arxiv.org/pdf/1101.0767v2.pdf>>, In Proceedings of the American Mathematics Society, Jan. 2011, pp. 9.

Muthukrishnan, et al., "Optimal Private Halfspace Counting via Discrepancy", Retrieved at <<http://arxiv.org/pdf/1203.5453.pdf>>, In Proceedings of the 44th Symposium on Theory of Computing, Mar. 27, 2012, pp. 13.

Nissim, et al., "Smooth Sensitivity and Sampling in Private Data Analysis", Retrieved at <<http://www.cse.psu.edu/~sofya/pubs/smooth-sensitivity-stoc.pdf>>, In Proceedings of the Thirty-Ninth Annual ACM Symposium on Theory of Computing, Jun. 11, 2007, pp. 10.

Raskutti, et al., "Minimax Rates of Estimation for High-Dimensional Linear Regression Over Iq -Balls", Retrieved at <<http://ieeexplore.ieee.org/stamp/stamp.jsp?tp=&arnumber=6034739>>, In IEEE Transactions on Information Theory, vol. 57, Issue 10, Oct. 2011, pp. 19.

Rastogi, et al., "The Boundary between Privacy and Utility in Data Publishing", Retrieved at <<http://homes.cs.washington.edu/~suciu/paper-privacy-utility-vldb2007.pdf>>, In Proceedings of the 33rd International Conference on Very Large Data Bases, Sep. 23, 2007, pp. 12.

Roth, et al., "Interactive Privacy via the Median Mechanism", Retrieved at <<http://www.cis.upenn.edu/~aaroth/Papers/onlineprivacy.pdf>>, In Proceedings of the 42nd ACM Symposium on Theory of Computing, Jun. 5, 2010, pp. 10.

Vershynin, R.., "John's Decompositions: Selecting a Large Part", Retrieved at <<http://www-personal.umich.edu/~romanv/papers/john.pdf>>, In Israel Journal of Mathematics, vol. 122, Issue 1, Dec. 2001, pp. 22.

Xiao, et al., "Differential Privacy via Wavelet Transforms", Retrieved at <<http://ieeexplore.ieee.org/stamp/stamp.jsp? tp=&arnumber=5447831>>, In IEEE 26th International Conference on Data Engineering, Mar. 1, 2010, pp. 12.

XIAO1, et al., "Differentially Private Data Release through Multi-dimensional Partitioning", Retrieved at <<http://www.mathcs.emory.edu/~lxiong/research/pub/sdm10.pdf>>, In Proceedings of the 7th VLDB Conference on Secure Data Management, Sep. 17, 2010, pp. 20.

Yuan, et al., "Low-Rank Mechanism: Optimizing Batch Queries under Differential Privacy", Retrieved at <<http://vldb.org/pvldb/vol5/p1352_ganzhaoyuan_vldb2012.pdf>>, In Proceedings of the Very Large Database Endowment, vol. 5, Issue 11, Aug. 27, 2012, pp. 12.

* cited by examiner

DIFFERENTIALLY PRIVATE LINEAR QUERIES ON HISTOGRAMS

BACKGROUND

In recent years, there has been an abundance of rich and fine-grained data about individuals in domains such as healthcare, finance, retail, web search, and social networks. It is desirable for data collectors to enable third parties to perform complex data mining applications over such data. However, privacy is an obstacle that arises when sharing data about individuals with third parties, since the data about each individual may contain private and sensitive information.

One solution to the privacy problem is to add noise to the data. The addition of the noise may prevent a malicious third party from determining the identity of a user whose personal information is part of the data or from establishing with certainty any previously unknown attributes of a given user. However, while such methods are effective in providing privacy protection, they may overly distort the data, reducing the value of the data to third parties for data mining applications.

A system is said to provide differential privacy if the presence or absence of a particular record or value cannot be determined based on an output of the system, or can only be determined with a very low probability. For example, in the case of medical data, a system may be provided that outputs answers to queries supplied such as the number of users with diabetes. While the output of such a system may be anonymous in that it does not reveal the identity of the patients associated with the data, a curious user may attempt to make inferences about the presence or absence of patients by varying the queries made to the system and observing the changes in output. For example, a user may have preexisting knowledge about a rare condition associated with a patient and may infer other information about the patient by restricting queries to users having the condition. Such a system may not provide differential privacy because the presence or absence of a patient in the medical data (i.e., a record) may be inferred from the answers returned to the queries (i.e., output).

Typically, systems provide differential privacy (for protecting the privacy of user data stored in a database) by introducing some amount of error or noise to the data or to the results of operations or queries performed on the data to hide specific information of any individual user. For example, noise may be added to each query using a distribution such as a Laplacian distribution. At the same time, one would like the noise to be as small as possible so that the answers are still meaningful. Existing methods may add more error or noise than is necessary or optimal to provide differential privacy protection (i.e., ensuring the privacy goal be met).

SUMMARY

Techniques are provided for protecting the privacy of datasets responsive to linear queries on histograms. A database containing private data is queried. Base decomposition is performed to recursively compute an orthonormal basis for the database space. Using correlated (or Gaussian) noise and/or least squares estimation, an answer having differential privacy is generated and provided in response to the query.

In some implementations, the differential privacy is $\epsilon$-differential privacy (pure differential privacy). In some implementations, the differential privacy is ($\epsilon$, $\delta$)-differential privacy (i.e., approximate differential privacy).

In some implementations, the data in the database may be dense. Such implementations may use correlated noise without using least squares estimation. In other implementations, the data in the database may be sparse. Such implementations may use least squares estimation with or without using correlated noise, depending on the implementation.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Differential privacy is a privacy definition that has become the standard notion of privacy in statistical databases. Informally, a mechanism (a randomized function on databases) satisfies differential privacy if the distribution of the outcome of the mechanism does not change noticeably when one individual's input to the database is changed. Privacy is measured by how small this change is: an $\epsilon$-differentially private mechanism M satisfies $\Pr[M(x)\in S]\leq\exp(\epsilon)\Pr[M(x')\in S]$ for any pair x, x' of neighboring databases, and for any measurable subset S of the range. A relaxation of this definition is approximate differential privacy. A mechanism M is ($\epsilon$, $\delta$)-differentially private if $\Pr[M(x)\in S]\leq\exp(\epsilon)\Pr[M(x')\in S]+\delta$ with x, x', S as before. Here, $\delta$ is thought of as negligible in the size of the database. Both these definitions satisfy properties such as composability, and are resistant to post-processing of the output of the mechanism.

In recent years, research has shown that this strong privacy definition still allows for very accurate analyses of statistical databases. At the same time, answering a large number of adversarially chosen queries accurately is inherently impossible with any semblance of privacy. Thus, there is an inherent trade-off between privacy and accuracy when answering a large number of queries. This trade-off is contemplated herein in the context of counting queries and more generally linear queries over histograms.

Figure 1:
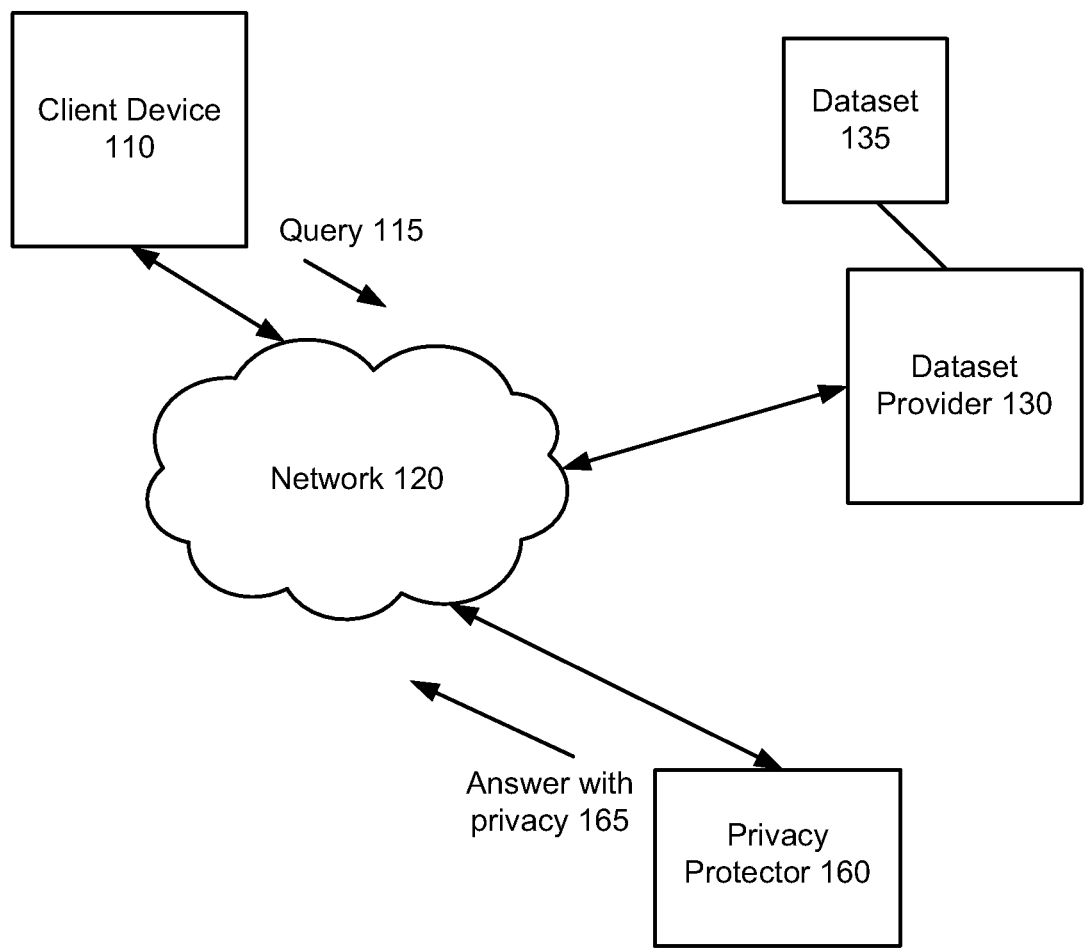
FIG. 1 is an illustration of an exemplary environment for protecting the privacy of datasets.

FIG. 1 is an illustration of an exemplary environment 100 for protecting the privacy of datasets such as data in one or more databases. The environment 100 may include a dataset provider 130, a privacy protector 160, and a client device 110. The client device 110, dataset provider 130, and the privacy protector 160 may be configured to communicate through a network 120. The network 120 may be a variety of network types including the public switched telephone network (PSTN), a cellular telephone network, and a packet switched network (e.g., the Internet). While only one client device 110, dataset provider 130, and privacy protector 160 are shown, it is for illustrative purposes only; there is no limit to the number of client devices 110, dataset providers 130, and privacy protectors 160 that may be supported by the environment 100.

Figure 6:
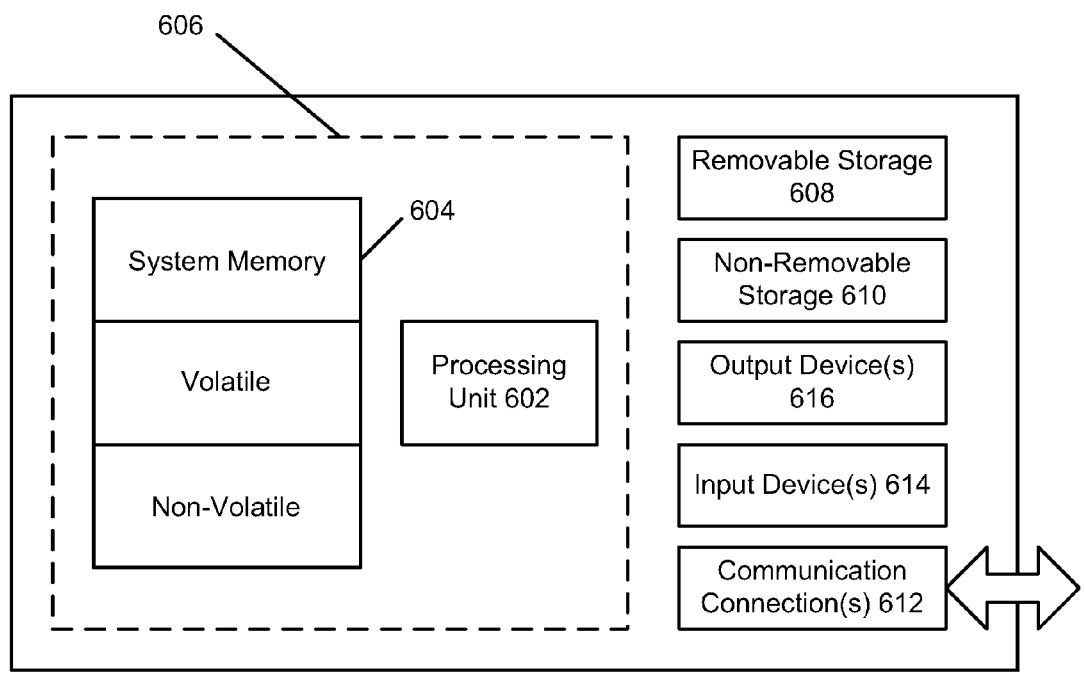
FIG. 6 shows an exemplary computing environment in which example embodiments and aspects may be implemented.

In some implementations, the client device 110 may include a desktop personal computer, workstation, laptop, PDA, smart phone, cell phone, or any WAP-enabled device or any other computing device capable of interfacing directly or indirectly with the network 120, such as the computing device 600 described with respect to FIG. 6. The client device 110 may run an HTTP client, e.g., a browsing program, such as MICROSOFT INTERNET EXPLORER or other browser, or a WAP-enabled browser in the case of a cell phone, PDA or other wireless device, or the like.

The dataset provider 130 may generate a dataset 135. The dataset 135 may be in a database format, for example, and comprise a collection of data and may include data related to a variety of topics including but not limited to healthcare, finance, retail, and social networking. The dataset 135 may have a plurality of rows and each row may have a number of values or columns. The number of values associated with each row in the dataset 135 is referred to as the dimension of the dataset 135. Thus, for example, a row with twenty columns has a dimension of twenty.

In some implementations, depending on the type of dataset 135, each row of the dataset 135 may correspond to a user, and each value may correspond to an attribute of the user. For example, where the dataset 135 is healthcare data, there may be a row for each user associated with the dataset 135 and the values of the row may include height, weight, sex, and blood type.

As may be appreciated, publishing or providing the dataset 135 by the dataset provider 130 may raise privacy issues, as would publishing or providing a query answer based on the dataset. Even where personal information such as name or social security number have been removed from the dataset 135, malicious users may still be able to identify users based on the dataset 135 or answers obtained from the dataset 135, or through combination with other information such as information found on the internet or from other datasets.

Accordingly, the privacy protector 160 may receive the dataset 135 and a query 115 and may generate an answer 165 with privacy using the dataset 135 and the query 115. The answer 165 may then be published or provided to the client device 110 (e.g., that provided the query). The answer 165 generated by the privacy protector 160 may provide one or more privacy guarantees. The desired privacy guarantee(s) may be received from a user or administrator, for example.

Figure 2:
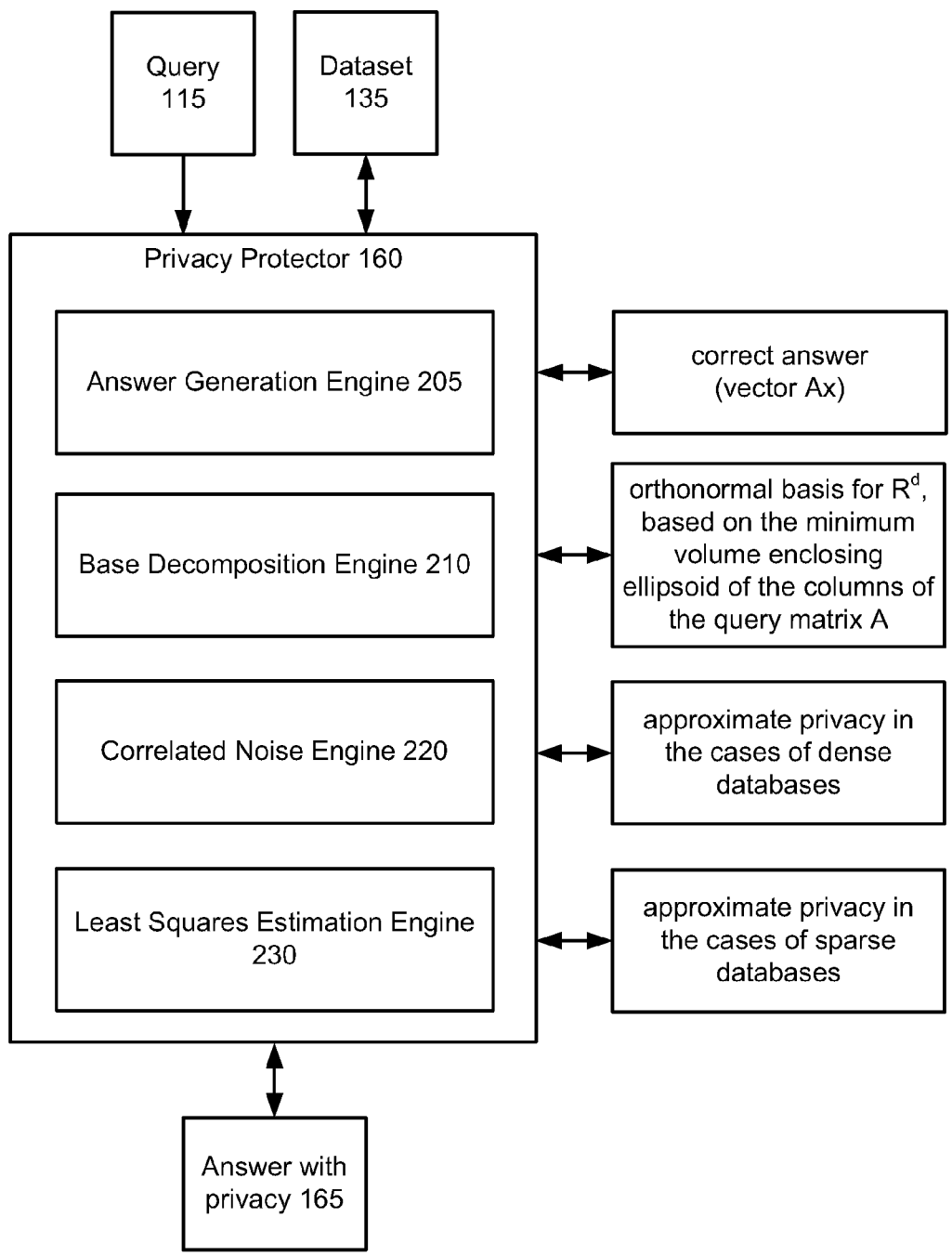
FIG. 2 is an illustration of an example privacy protector.

As described further with respect to FIG. 2, in implementations, the privacy protector 160 may provide the privacy guarantees using efficient nearly optimal algorithms for approximate privacy in the cases of dense databases and sparse databases.

In an implementation, the dataset 135 may comprise a database that contains n people in a universe of size N (i.e., the number of types of people is denoted N). A histogram of the database is denoted x. The histogram x is a vector in $R^N$, with $x_i$ denoting the number of people of type i in the database, and $R^N$ denoting the set of all possible databases. The mapping from people to types may be application specific, depending on the implementation.

More particularly, a database is given by a multiset of database rows, one for each individual (i.e., private data may be modeled as a database D of n rows, where each row of database D contains information about an individual). Formally, a database D is a multiset of size n of elements of the universe $N=\{t_1, \ldots, t_N\}$ of possible user types (i.e., N denotes the size of the universe that the rows come from, and n denotes the number of individuals in the database). The database can be represented as its histogram $x \in R^N$ with $x_i$ denoting the number of occurrences of the i-th element of the universe. The algorithms herein take as input a histogram $x \in R^N$ of the database D, where the i-th component $x_i$ of x encodes the number of individuals in D of type $t_i$. Thus, x would be a vector of non-negative integers with $\|x\|_1=n$. Therefore, in this histogram representation, $\|x\|_1=n$ when D is a database of size n. Also, two neighboring databases D and D' that differ in the presence or absence of a single individual correspond to two histograms x and x' satisfying $\|x-x'\|_1=1$. As described further herein, accurate answers may be obtained for a given set of d linear queries over this histogram x. This set of queries can be represented by a matrix $A \in R^{d \times N}$ with the vector $Ax \in R^d$ giving the correct answers to the queries. When $A \in \{0,1\}^{d \times N}$, such queries are referred to as counting queries.

In other words, a histogram vector is a N-dimensional vector which counts the number of users of each type. The queries are specified by a d*N matrix A, and the query result is the vector Ax. The matrix A is a d*N matrix corresponding to d linear questions about the vector x. The correct answer to this set of d queries is given by the vector Ax. The definition of differential privacy and its error metric is well known to those of skill in the art.

In an implementation, nearly minimal error (in terms of the mean squared error) is added to the query results while guaranteeing (ε, δ)-differential privacy regardless of the number of people n in the database. This noise distribution is a correlated Gaussian and depends on the query matrix A, and can often add a lot less noise than the worst case bound of approximately $\sqrt{n}$ noise per query. This implementation has error close to the best possible. As described further herein, the matrix A is decomposed into smaller components via the minimum volume enclosing ellipsoid of the symmetric convex hull of the column vectors of A.

Approximate differential privacy (i.e., (ε, δ)-differential privacy) may be defined as follows. A (randomized algorithm) M with input domain $R^N$ and output range Y is (ε, δ)-differentially private if for every n, every x,x' with $\|x-x'\|_1=1$, and every $S \subseteq Y$, M satisfies $Pr[M(x) \in S] \leq exp(\epsilon) Pr[M(x') \in S] + \delta$.

The (ε, δ)-differential privacy guarantee provides that a malicious user or third-party researcher who knows all of the attribute values of the dataset 135 but one attribute for one user, cannot infer with confidence the value of the attribute from the information published by the algorithm (i.e., the answer 165).

In some implementations (e.g., when δ=0), the privacy protector 160 may guarantee a stricter form of privacy protection called ε-differential privacy (or pure differential privacy). In ε-differential privacy, the δ parameter is set to zero. A basic property of differential privacy is that the privacy guarantees degrade smoothly under composition and are not affected by post-processing. Other privacy guarantees may also be supported, such as privacy guarantees related to comparing posterior probabilities with prior probability, or guarantees related to anonymity.

FIG. 2 is an illustration of an example privacy protector 160. As shown, the privacy protector 160 includes one or more components including an answer generation engine 205, a base decomposition engine 210, a correlated noise engine 220, and a least squares estimation engine 230. More or fewer components may be supported. The privacy protector 160, and its various components including the engines 205, 210, 220, 230 may be implemented using a general purpose computing device including the computing device 600.

In accordance with the implementations herein, efficient nearly optimal algorithms for approximate privacy in the cases of dense databases ($n>d/\epsilon$, using the correlated noise engine 220 for example) and sparse databases ($n=o(d/\epsilon)$, using the least squares estimation engine 230 for example) are provided. Implementations use the base decomposition engine 210 to recursively compute an orthonormal basis for $R^d$, based on the minimum volume enclosing ellipsoid (MEE) or approximate MEE of the columns of the query matrix A.

In an implementation, a query 115 and the dataset 135 are provided to the privacy protector 160. The answer generation engine 205, using known techniques for example, determines the correct answer to the query. At this point, the correct answer does not contain differential privacy and does not have noise added to it. Depending on the implementation, differential privacy is subsequently provided to the correct answer by the base decomposition engine 210, the correlated noise engine 220, and/or the least squares estimation engine 230.

In an implementation, the base decomposition engine 210 may use a base decomposition technique (an example is shown below as Algorithm 1) to compute the orthonormal basis for $R^d$, which may then be used by the correlated noise engine 220 and/or the least squares estimation engine 230.

---
Algorithm 1 Base Decomposition
---

Input $A = (a_j)_{j=1}^N \in R^{d \times n}$ (rankA = d);
    Compute $E = FB_2^d$, the minimum volume enclosing ellipsoid of K = AB;
    Let $(u_i)_{i=1}^d$ be the (left) singular vectors of F corresponding to singular values $\sigma_1 \geq \ldots \geq \sigma_d$;
    if d=1 then
        Output $U_1 = u_1$.
    else
        Let $U_1 = (u_i)_{i>d/2}$ and $V = (u_i)_{i \leq d/2}$;
        Recursively compute a base decomposition $V_2, \ldots V_k$ of $V^T A$ ($k \leq \lceil 1 + \log d \rceil$ is the depth of the recursion);
        For each i>1, let $U_i = V V_i$;
        Output $\{U_1, \ldots U_k\}$.
    end if.

---

Algorithm 1, given a matrix $A \in R^{d \times N}$, computes a set of orthonormal matrices $U_1, \ldots, U_k$, where $k \geq \lceil 1 + \log d \rceil$. For each $i \neq j$, $U_i^T U_j = 0$, and the union of columns $U_1, \ldots, U_k$ forms an orthonormal basis for $R^d$. Thus, Algorithm 1 computes a basis for $R^d$, and partitions ("decomposes") it into $k = O(\log d)$ bases of mutually orthogonal subspaces. This set of bases also induces a decomposition of A into $A = A_1 + \ldots + A_k$, where $A_i = U_i U_i^T A$.

The base decomposition of Algorithm 1 may be used in both the dense case and sparse case following techniques and implementations described further herein. Intuitively, for both cases it can be shown that the error of a mechanism applied to $A_i$ can be matched by an error lower bound for $A_{i+1} + \ldots + A_k$. The error lower bounds are based on the spectral lower bound on discrepancy; the geometric properties of the minimum enclosing ellipsoid of a convex body together with the known restricted invertibility principle of Bourgain and Tzafriri may be used in deriving the lower bounds.

In an implementation, the correlated noise engine 220 may use a technique (an example is shown below as Algorithm 2) whose expected error matches the spectral lower bound up to polylogarithmic factors and is therefore nearly optimal. The technique adds correlated unbiased Gaussian noise to the exact answer Ax. The noise distribution is computed based on the decomposition algorithm above (Algorithm 1). An example of Algorithm 2 is given as:

---
Algorithm 2 Gaussian Noise Mechanism
---

Input (Public): query matrix $A = (a_j)_{j=1}^N \in R^{d \times n}$ (rankA = d);
Input (Private): database $x \in R^N$
    Let $U_1, \ldots, U_k$ be base decomposition computed by Algorithm 1 on input A, where $U_i$ is an orthonormal basis for a space dimension $d_i$;

$$\text{Let } c(\varepsilon, \delta) = \frac{1 + \sqrt{2\ln\left(\frac{1}{\delta}\right)}}{\varepsilon}$$

For each i, let $r_i = \max_{j=1}^N \|U_i^T A_j\|_2$
    For each i, sample $w_i \sim N(0, c(\varepsilon, \delta))^{d_i}$ $$\text{Output } Ax + \sqrt{k} \sum_{i=1}^k r_i U_i w_i$$

---

The output of Algorithm 2 satisfies ($\epsilon$, $\delta$)-differential privacy.

In an implementation, a sequence of minimum volume enclosing ellipsoids and projections is computed by the correlated noise engine 220, which is only dependent on the query, not on the data. For each projection, the correlated noise engine 220 (alone or in conjunction with the answer generation engine 205, depending on the implementation) determines the correct answer, and then adds Gaussian noise to the answer. Answers to the original query 115 may be constructed using the answers to projections.

More particularly, in an implementation, look at the convex body $K = AB_1^N$, i.e., the image of the unit $l_1$ ball under the linear map A. $B_1^N$ is the $l_1$ ball of radius 1 in $R^N$ (this is the set of points x in $R^N$ such that $|x|_1$ (defined as $\Sigma|x_i|$) is at most 1). This is a symmetric convex body in d dimensions. First compute E, the minimum volume ellipsoid that encloses K (also known as the John ellipsoid of K).

Next look at the axes of this ellipsoid E and look at their lengths $\sigma_1 \leq \sigma_2 \geq \ldots \geq \sigma_N$ in decreasing order. Suppose that the corresponding axes are $v_1, \ldots v_N$. Let V be the subspace spanned by the axes $v_1, \ldots v_n$, and let W be the complementary subspace. Let $K_V$, $K_W$, and $E_V$, $E_W$ denote the projections of K and E to V and W, respectively.

Let y=Ax denote the true answer to the query and let $y_V$ and $y_W$ denote its projection to V and W, respectively. Next compute $y'_V$ and $y'_W$: the projection of y' on V and W, respectively (as described further below). The noisy answer y' is equal to y', $+y'_W$.

$y'_V$ is defined by adding multidimensional Gaussian noise to $y_V$ according to the distribution defined by a scaled version of $E_V$. More precisely, add noise proportional to $$\frac{1+\sqrt{2\ln\left(\frac{1}{\delta}\right)}}{\varepsilon} \text{ times } \sigma_i$$

along the i-th axis $v_i$ of E, for $1 \leq l \leq n$.

$y'_W$ is defined by adding Gaussian noise to each coordinate of $y_W$, of magnitude $$\frac{1+\sqrt{2\ln\left(\frac{1}{\delta}\right)}}{\varepsilon} \text{ times } \sigma_{n+1}$$

and then using least squares projection to find the closest vector in $nK_W$ to the resulting noisy answer. This closest vector in $nK_W$ is defined as $y'_W$.

This gives an $(\epsilon,\delta)$ differentially private mechanism which has error at most a polylog(d,n,N) times the optimal. Polylog(d,n,N) denotes some function which is bounded by some polynomial of log d, log n, and log N.

When a $(\epsilon,0)$ differentially private mechanism is desired, change the procedure to get $y'_V$ and $y'_W$. $y'_V$ can be obtained using the well known generalized K-norm mechanism (e.g., Moritz Hardt and Kunal Talwar) according to the body $K_V$. $y'_W$ can be obtained by first running the generalized K-norm mechanism according to the body $K_W$, and then using least-squares projection to find the closest vector in $nK_W$ to the noisy answer returned by generalized K-norm.

In another implementation, one can replace the exact minimum enclosing ellipsoid by an approximate one. As long as the approximation is good enough, the optimality can still be guaranteed.

In another implementation, which can be used alone or in conjunction with other implementations described herein, noise is reduced when the histogram x is known to be sparse (e.g., when number of people n in the database D is small). In this denoising implementation, the data analyst (or the curator, user, or administrator, for example) applies the least squares estimation (e.g., via the least squares estimation engine 230) on the noisy answer, to fit the noisy histogram to an answer that is consistent with the histogram having total weight $n=|x|_1$ (i.e., $n=\Sigma|x_i|$) where $x_i$ is the number of people of type i, and n is the number of people in the database. It can be shown that even amongst mechanisms whose error is a function of the sparsity n, the correlated Gaussian noise coupled with least squares estimation leads to a near optimal mechanism. This denoising implementation reduces error and can be used with any differentially private mechanism, including those described herein.

In an implementation, the least squares estimation engine 230 may use a technique (an example is shown below as Algorithm 3) with stronger accuracy guarantees than Algorithm 2. It may be used for any query matrix A and any database size bound n. The technique combines the noise distribution of Algorithm 2 with a least squares estimation step. Privacy is guaranteed by noise addition, while the least squares estimation step reduces the error significantly when $n=o(d/\epsilon)$. An example of Algorithm 3 is given as:

| Algorithm 3 Least Squares Mechanism |
| --- |
| Input (Public): query matrix $A = (a_i)_{i=1}^N \in R^{d \times n}$ (rankA = d); database size bound n;<br>Input (Private): database $x \in R^N$<br>    Let $U_1, ..., U_k$ be base decomposition computed by Algorithm 1 on input A, where $U_i$ is an orthonormal basis for a space dimension $d_i$;<br>    Let t be the largest integer such that $d_t \geq \epsilon n$;<br>    Let $X = \Sigma_{i=1}^{t} U_i$ and $Y = \Sigma_{i=t+1}^{k} U_i$;<br>    Call Algorithm 2 to compute $\tilde{y} = M_g(A, x)$;<br>    Let $\tilde{y}_1 = XX^T \tilde{y}$ and $\tilde{y}_2 = YY^T\tilde{y}$;<br>    Let $\hat{y}_1 = \arg\min\{\|\tilde{y}_1 - \hat{y}_1\|_2^2 : \hat{y}_1 \in nXX^T K\}$, where $K=AB_1$;<br>    Output $\hat{y}_1 + \tilde{y}_2$. |

The output of Algorithm 3 satisfies $(\epsilon,\delta)$-differential privacy.

More particularly, the least squares estimation engine may take an answer, such as the first noisy answer y' and find a y" such that y"=Ax" for some x" with $\Sigma_i|x"_i|$ being at most n, and $|y'-y"|_2$ being as small as possible amongst all such y". This operation is referred to as least squares estimation where the nearest point to y' in the convex body $nAB_1^N$ is determined. Various algorithms are known to solve this least squares estimation problem efficiently, such as Algorithm 3 above. It can be shown that y" is much closer to y than y', and this implies that the noise added to an average coordinate is only $\sqrt{n}$ polylog(d,N).

In an implementation, a least squares projection to the image of the $I_0$ ball of radius n may be used, instead of the $I_1$ ball as above (an $I_0$ ball of radius n is the set of points x in $R^N$ that have at most n non-zero coordinates). This may give better utility guarantee, at the cost of a more computationally intensive projection step.

It is contemplated that when the query A is a counting query or has entries in [−1,1], one can use spherical Gaussian noise (which is independent of the query) along with least squares to achieve the best possible bounds.

It is noted that in some settings n itself may not be public. This may be handled, for example, by publishing a noisy version of n by adding Laplacian noise to the true n.

Figure 3:
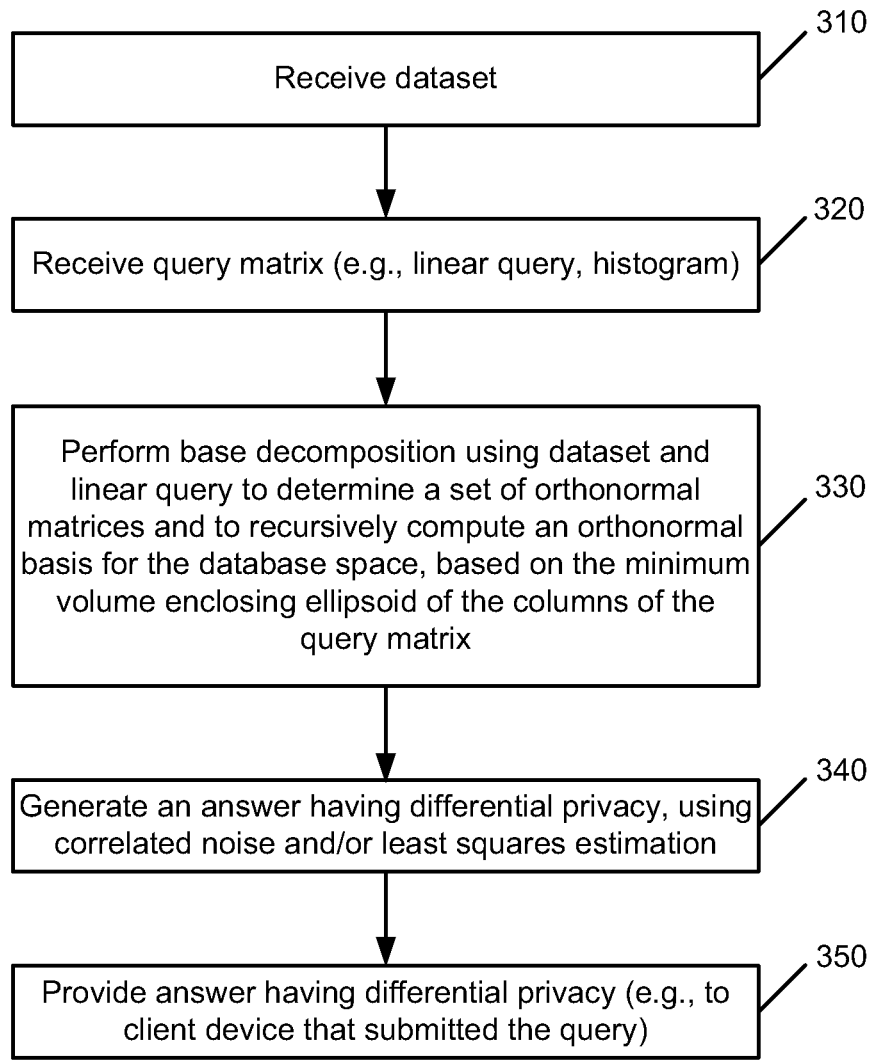
FIG. 3 is an operational flow of an implementation of a method that may be used in providing differential privacy to an answer to a query.

FIG. 3 is an operational flow of an implementation of a method 300 that may be used in providing differential privacy to a dataset. A dataset is received at 310. The dataset 135 may be received by the privacy protector 160 from a dataset provider 130. The dataset 135 may comprise a database, or be retrieved from a database or other storage or memory, and may be a private dataset or a public dataset and may include a plurality of rows and each row may have a plurality of values or columns. The number of values in each row of the dataset 135 corresponds to the dimension of the dataset 135.

At 320, a query 115, in the form of a query matrix such as a linear query or histogram, is received at the privacy protector 160. The query 115 may be received from a client device 110, for example.

At 330, a base decomposition engine 210 of the privacy protector 160 performs base decomposition using the dataset 135 and the query 115, as described above. In this manner, a set of orthonormal matrices is determined, and an orthonormal basis for the database space is recursively computed.

Using the results of the base decomposition, an answer 165 having differential privacy is generated at 340. The answer 165 with differential privacy may be generated using a correlated noise engine 220 and/or a least squares estimation engine 230 and their associated techniques as described above, for example.

At 350, the answer 165 having differential privacy is provided, e.g., by the privacy protector 160 to the client device 110. Alternatively or additionally, the answer 165 having differential privacy may be published so that it may be downloaded by interested third-party researchers or users.

Figure 4:
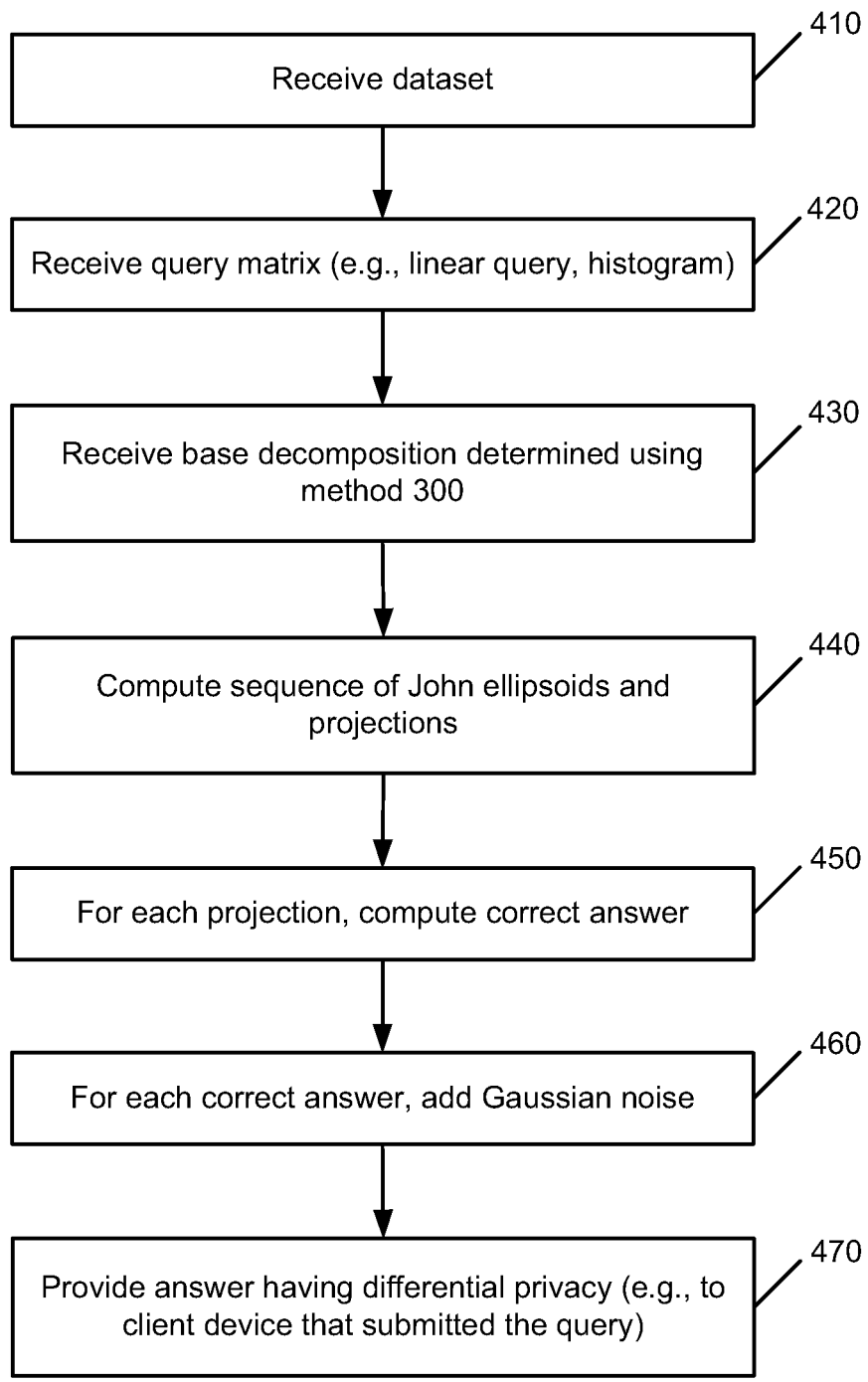
FIG. 4 is an operational flow of an implementation of a method for providing differential privacy in the case of a dense database.

FIG. 4 is an operational flow of an implementation of a method 400 for providing differential privacy in the case of a dense database. The method 400 may be implemented by a correlated noise engine 220. At 410 and 420 respectively, a dataset 135 and a query 115 are received by the privacy protector 160. These operations are similar to those described above with respect to 310 and 320, and their descriptions are omitted for brevity.

At 430, the results of the base decomposition technique (e.g., from 330) are received at the correlated noise engine 220 from the base decomposition engine 210. A sequence of John ellipsoids and projections are computed at 440, using techniques such as those detailed above (e.g., with respect to FIGS. 1 and 2). It is noted that the sequence of John ellipsoids and projections is dependent on the query, and not on the data.

At 450, for each projection, a correct answer is determined by the correlated noise engine 220. The correct answer is the actual answer that does not yet have any privacy or noise added to it. At 460, for each correct answer, the correlated noise engine 220 adds Gaussian noise to it to obtain an answer 165 having differential privacy. As detailed above, the correct answer y=Ax is obtained, and independent Gaussian noise is added to each coordinate of y of standard deviation $(\sqrt{d} \log(1^\delta))/\epsilon$ to get a noisy answer y'. This process guarantees that releasing y' does not compromise the privacy of any individual in the database: formally, this guarantees $(\epsilon, \delta)$ differential privacy. Additional details of these operations are provided above (e.g., with respect to FIGS. 1 and 2).

At 470, similar to 350, the answer 165 having differential privacy is provided, e.g., by the privacy protector 160 to the client device 110 and/or is published.

Figure 5:
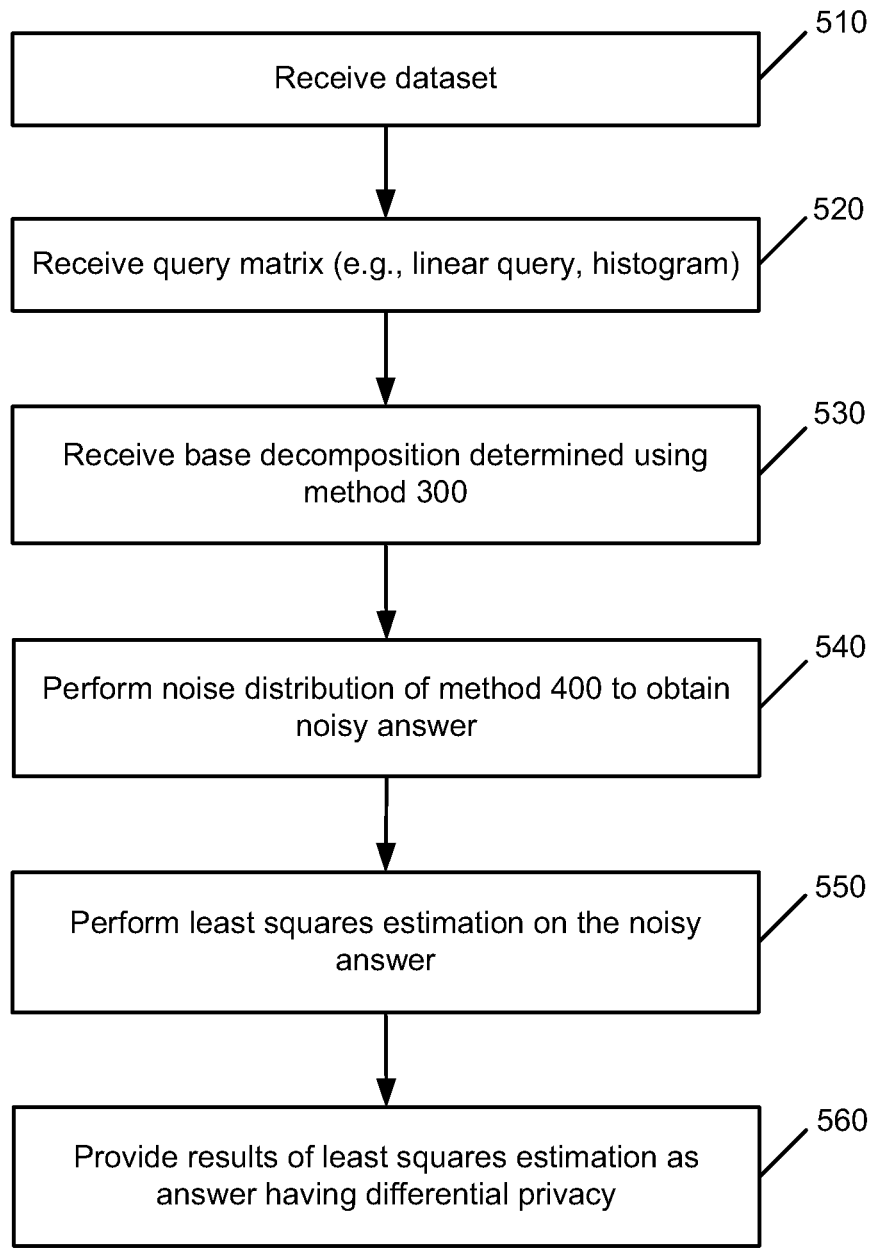
FIG. 5 is an operational flow of an implementation of a method for providing differential privacy in the case of a sparse database.

FIG. 5 is an operational flow of an implementation of a method 500 for providing differential privacy in the case of a sparse database. The method 500 may be implemented by a least squares estimation engine 230.

At 510 and 520 respectively, a dataset 135 and a query 115 are received by the privacy protector 160. These operations are similar to those described above with respect to 310 and 320, and their descriptions are omitted for brevity.

At 530, the results of the base decomposition technique (e.g., from 330) are received at the least squares estimation engine 230 from the base decomposition engine 210. At 540, a noise distribution technique (e.g., of the method 400) may be performed to obtain a noisy answer.

At 550, a least squares estimation technique (such as described above with respect to FIGS. 1 and 2) is performed on the noisy answer. The results of the least squares estimation technique may be provided (e.g., to the client device 110) as an answer having differential privacy (e.g., an answer 165).

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network personal computers, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving a dataset from a memory of a computing device;
receiving a query by the computing device through a network;
performing base decomposition using the dataset and the query to generate an orthonormal basis, by the computing device;
generating an answer to the query by the computing device;
adding noise to the answer, by the computing device, using the orthonormal basis, to protect differential privacy of the dataset stored in the memory of the computing device by preventing the determination of the presence or absence of a value from the dataset based on the answer with the added noise; and
providing the answer with the added noise by the computing device through the network.

2. The method of claim 1, wherein the dataset comprises a database.

3. The method of claim 1, wherein the query comprises a linear query on a histogram.

4. The method of claim 1, wherein the query is a query matrix.

5. The method of claim 4, further comprising performing the base decomposition by determining a set of orthonormal matrices and recursively computing an orthonormal basis for the dataset, based on a minimum volume enclosing ellipsoid of columns of the query matrix.

6. The method of claim 1, wherein adding noise to the answer comprises using correlated noise to add noise to the answer, wherein using the correlated noise comprises:
computing a sequence of John ellipsoids and projections based on the query;
determining a correct answer for each of the projections;
adding Gaussian noise to each correct answer according to the corresponding John ellipsoid; and
combining the answers from at least two of the projections.

7. The method of claim 1, wherein adding noise to the answer comprises using least squares estimation to add noise to the answer, wherein using the least squares estimation comprises:
receiving a noisy answer; and
performing the least squares estimation on the noisy answer to generate the answer with noise.

8. The method of claim 7, wherein the noisy answer is generated using correlated noise.

9. The method of claim 1, further comprising determining whether the dataset is dense or sparse, and adding noise to the answer using correlated noise if the dataset is dense, and adding noise to the answer using least squares estimation if the dataset is sparse.

10. The method of claim 1, further comprising generating the noise based on the differential privacy.

11. The method of claim 10, wherein the differential privacy comprises $\epsilon$-differential privacy or $(\epsilon,\delta)$-differential privacy.

12. A method comprising:
receiving a query at a computing device through a network;
determining an answer to the query, by the computing device, using a database stored in a memory of the computing device;
performing base decomposition using the database and the query, by the computing device, to generate an orthonormal basis;
adding noise to the answer, by the computing device, using the orthonormal basis, to protect differential privacy of the database stored in the memory of the computing device by preventing the determination of the presence or absence of a value from the database based on the answer with the added noise; and
providing the answer with the added noise by the computing device through the network.

13. The method of claim 12, wherein the differential privacy comprises $\epsilon$-differential privacy or $(\epsilon,\delta)$-differential privacy.

14. The method of claim 12, wherein adding noise to the answer comprises using correlated noise if the database is dense, and using least squares estimation if the database is sparse.

15. An apparatus comprising:
a processor;
a memory;
a privacy protector that:
receives a dataset from the memory;
receives a query through a network;
performs base decomposition using the dataset and the query to generate an orthonormal basis;
generates an answer to the query;
adds noise to the answer using the orthonormal basis to protect the differential privacy of the dataset stored in the memory by preventing the determination of the presence or absence of a value from the dataset based on the answer with the added noise; and
provides the answer with the added noise through the network.

16. The apparatus of claim 15, wherein the privacy protector further generates the noise based on the differential privacy.

17. The apparatus of claim 15, wherein the privacy protector further determines whether the dataset is dense or sparse, and adds noise to the answer using correlated noise if the dataset is dense, and adds noise to the answer using least squares estimation if the dataset is sparse.

18. The method of claim 12, wherein the query comprises a linear query on a histogram.

19. The apparatus of claim 15, wherein the dataset comprises a database.

20. The apparatus of claim 15, wherein the query comprises a linear query on a histogram.

21. The apparatus of claim 15, wherein the query is a query matrix.

22. The apparatus of claim 21, wherein the privacy protector further performs the base decomposition by determining a set of orthonormal matrices and recursively computing an orthonormal basis for the dataset, based on a minimum volume enclosing ellipsoid of columns of the query matrix.

23. The apparatus of claim 15, wherein the privacy protector that adds noise to the answer comprises the privacy protector that uses correlated noise to add noise to the answer, wherein using the correlated noise comprises:
    computing a sequence of John ellipsoids and projections based on the query;
    determining a correct answer for each of the projections;
    adding Gaussian noise to each correct answer according to the corresponding John ellipsoid; and
    combining the answers from at least two of the projections.

24. The apparatus of claim 15, wherein the privacy protector that adds noise to the answer comprises the privacy protector that uses least squares estimation to add noise to the answer, wherein using the least squares estimation comprises:
    receiving a noisy answer; and
    performing the least squares estimation on the noisy answer to generate the answer with noise.

25. The apparatus of claim 24, wherein the noisy answer is generated using correlated noise.

26. An apparatus comprising:
    a processor;
    a memory; and
    a privacy protector that:
        receives a query through a network;
        determines an answer to the query using a database, wherein the database is stored in the memory;
        performs base decomposition using the database and the query to generate an orthonormal basis;
        adds noise to the answer using the orthonormal basis, to protect differential privacy of the database stored in the memory by preventing the determination of the presence or absence of a value from the database based on the answer with the added noise; and
        provides the answer with the added noise through the network.

27. The apparatus of claim 26, wherein the differential privacy comprises $\epsilon$-differential privacy or $(\epsilon,\delta)$-differential privacy.

28. The apparatus of claim 26, wherein the privacy protector that adds noise to the answer comprises the privacy protector that uses correlated noise if the database is dense, and uses least squares estimation if the database is sparse.

29. The apparatus of claim 26, wherein the query comprises a linear query on a histogram.

* * * * *